(12) United States Patent
Nezhad-Ahmadi et al.

(10) Patent No.: US 8,923,777 B2
(45) Date of Patent: Dec. 30, 2014

(54) LOW-IF TRANSCEIVER ARCHITECTURE

(71) Applicants: Mohammad-Reza Nezhad-Ahmadi, Waterloo (CA); Gareth Pryce Weale, New Hamburg (CA)

(72) Inventors: Mohammad-Reza Nezhad-Ahmadi, Waterloo (CA); Gareth Pryce Weale, New Hamburg (CA)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/776,475

(22) Filed: Feb. 25, 2013

(65) Prior Publication Data
US 2014/0029682 A1 Jan. 30, 2014

Related U.S. Application Data

(62) Division of application No. 12/209,774, filed on Sep. 12, 2008, now Pat. No. 8,385,841.

(60) Provisional application No. 60/972,341, filed on Sep. 14, 2007.

(51) Int. Cl.
*H04B 1/38* (2006.01)
*H04L 27/10* (2006.01)
*H04B 1/00* (2006.01)

(52) U.S. Cl.
CPC ............ *H04L 27/10* (2013.01); *H04B 1/006* (2013.01); *H04B 1/0085* (2013.01)
USPC ............. 455/73; 455/78; 455/86; 370/278; 370/282; 375/219

(58) Field of Classification Search
USPC .......... 455/73, 78, 86, 91, 334; 370/278, 282, 370/360; 375/219
See application file for complete search history.

(56) References Cited

U.S. PATENT DOCUMENTS

| | | | |
|---|---|---|---|
| 5,710,984 A * | 1/1998 | Millar et al. | 455/80 |
| 7,477,921 B2 * | 1/2009 | Shattil | 455/562.1 |
| 7,636,554 B2 | 12/2009 | Sugar et al. | |
| 7,671,693 B2 * | 3/2010 | Brobston et al. | 333/17.3 |
| 2007/0140391 A1 | 6/2007 | Pan | |
| 2009/0135781 A1 | 5/2009 | Vaisanen et al. | |
| 2010/0297975 A1 | 11/2010 | Carrera et al. | |

FOREIGN PATENT DOCUMENTS

EP    1 207 627 A1    5/2002

* cited by examiner

*Primary Examiner* — Tuan H Nguyen

(57) ABSTRACT

A transceiver, receiver, and transmitter are provided. The transceiver may also include a programmable matching block configured to implement impedance-matching between an antenna and the receiver and/or between the antenna and the transmitter. The programmable matching block may implement the impedance-matching through a shared matching circuit block. The programmable matching block may include at least one of a programmable inductor and a programmable capacitor.

14 Claims, 20 Drawing Sheets

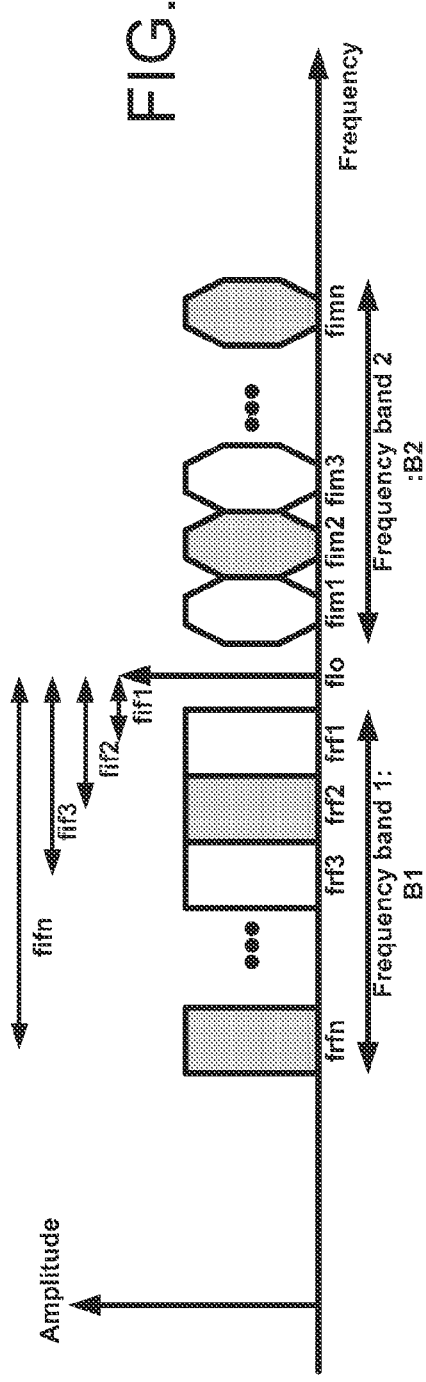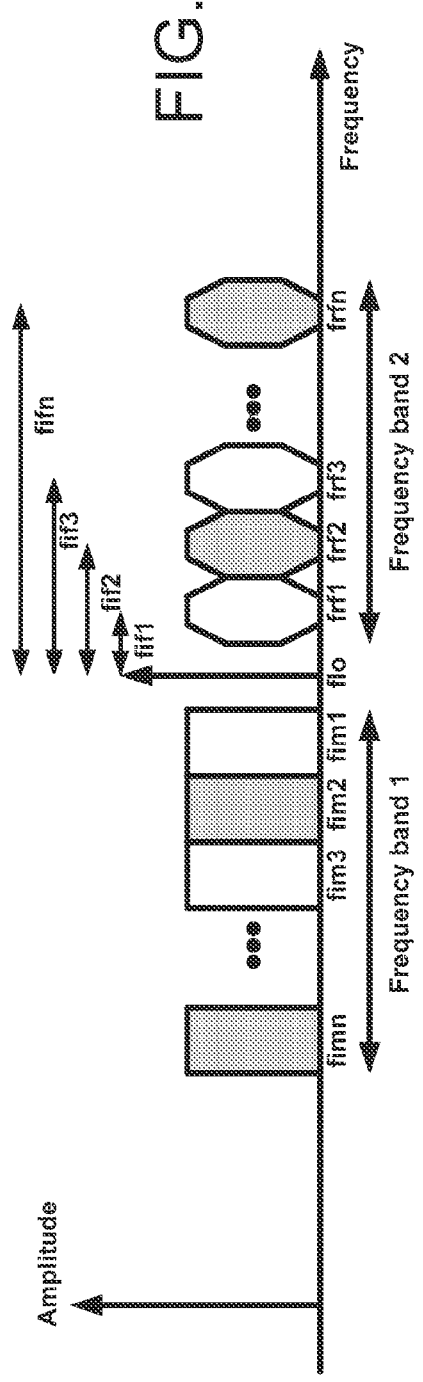

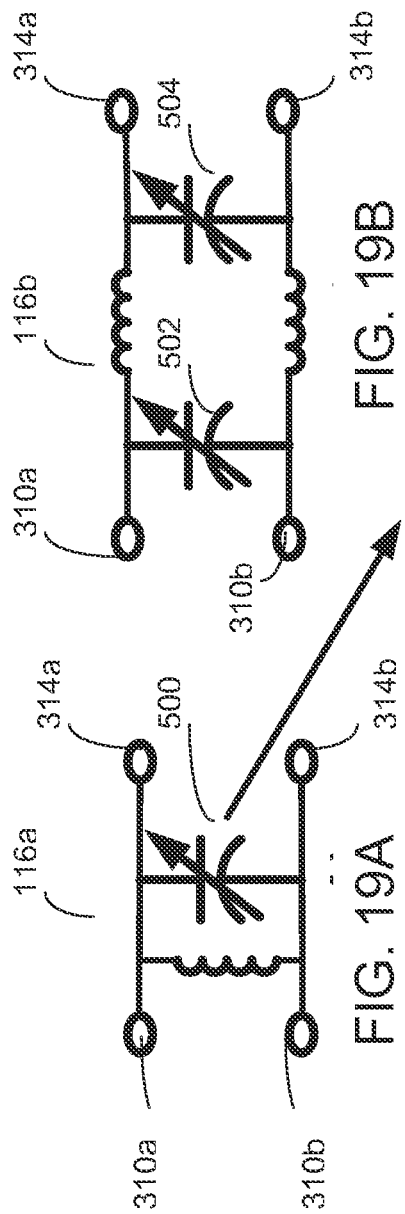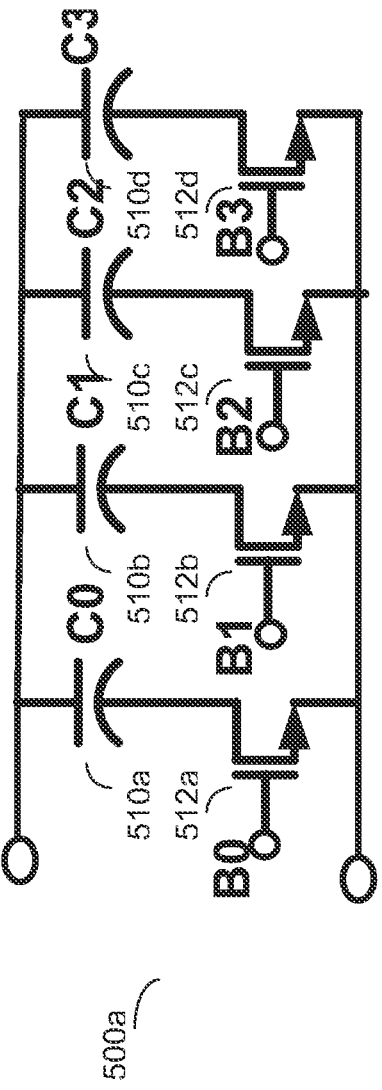

LOW-IF TRANSCEIVER ARCHITECTURE

The present application is a divisional of prior U.S. patent application Ser. No. 12/209,774, filed on Sep. 12, 2008 by Mohammad-Reza Nezhad-Ahmadi et al., titled "LOW-IF TRANSCEIVER ARCHITECTURE", which application is a non provisional of prior U.S. Provisional Patent Application No. 60/972,341, filed on Sep. 14, 2007. The above referenced applications are hereby incorporated by reference in their entirety, and priority thereto for common subject matter is hereby claimed.

FIELD OF INVENTION

The present invention relates to a transceiver, more specifically to a compact transceiver with a low-IF architecture.

BACKGROUND OF THE INVENTION

Wireless communications devices are used for a wide variety of applications, e.g., hearing aid, medical devices. In some of the wireless communications devices, a receiver uses a mixer for mixing a signal received from an antenna with a local oscillator (LO) signal. The mixer generates an IF (intermediate frequency) signal having a frequency in a lower frequency band. However, by the mixing operation, image band and desired band are translated into the same IF frequency. In order to remove the undesired frequency components, it is required to employ an image rejection mechanism in the receiver side.

FIG. 1 is a diagram illustrating a conventional 50 ohms and low-IF receiver. The receiver 10 of FIG. 1 includes a matching block 12 coupled to a 50 ohms antenna 14 for receiving communication signals, a low noise amplifier (LNA) 16, mixers 18 and 20, a 90° phase shifter 22 coupled to the output of the mixer 20, and an adder 24 for adding the output from the mixer 18 and the output from the 90° phase shifter 22. The matching block 12 converts the receiver input impedance to 50 ohms to match the receiver input to a 50 ohm conventional antenna. The receiver 10 includes a band pass filter (BPF) 26 coupled to the output of the adder 24, a limiting amplifier 28, and a demodulator 30 for recovering information. The output from the LNA 16 is mixed with quadrature phases of a local oscillator 40. Signals from two branches are added by the adder 24, then an undesired signal is cancelled.

The local oscillator block 40 includes a crystal oscillator 42, a synthesizer 44, and a 90° phase shifter 46. The local oscillator 40 produces quadrature local oscillator signals 50 and 52 that are 90° phase shifted with respect to each other. The local oscillator signals 50 and 52 are provided to the mixers 18 and 20, respectively.

FIG. 2 is a diagram illustrating another conventional 50 ohms and low-IF receiver 60. In receiver 60, a polyphase filter 62 is provided to the outputs of the mixers 18 and 20. One of the outputs from the polyphase filter 62 is directly supplied to the BPF 26. The polyphase filter 62 rejects the image signal and generates two wanted signal with 90 degree phase deference at the output. One of these signals can be connected to the next stage.

Some improvements have been done to the receivers/transceiver in order to reduce power consumption for portable devices. However currently available receivers/transceivers have still relatively high power consumption and large size.

There is a need to provide a low-power, compact image reject receiver, transmitter or transceiver having the receiver and the transmitter.

SUMMARY OF THE INVENTION

It is an object of the invention to provide a method and system that obviates or mitigates at least one of the disadvantages of existing systems.

According to an aspect of the present invention there is provided a transmitter, which includes an in-phase path and a quadrature path for conveying transmit data, a first path associated with a first local frequency and a second path associated with a second local frequency; and a band selector for swapping the in-phase and quadrature paths to switch connection between the in-phase and quadrature paths and the first and second paths.

According to another aspect of the present invention there is provided a receiver, which includes an in-phase path and a quadrature path for conveying received data, a polyphase filter having first and second inputs and first and second outputs, and a selector for swapping the in-phase and quadrature paths to switch connection between the in-phase and quadrature paths and the first and second inputs.

According to a further aspect of the present invention there is provided a transceiver, which includes a receiver and a transmitter. Each of the receiver and the transmitter includes in-phase signal and quadrature signal paths and first and second paths for processing signals on the in-phase signal and quadrature signal paths. Each of the receiver and the transmitter includes a band selector for selecting a band by swapping in-phase signal and quadrature signal paths.

According to a further aspect of the present invention there is provided a transceiver, which includes a receiver, a transmitter, and a programmable matching block for impedance-matching between an antenna and the receiver input and between the antenna and the transmitter output.

According to a further aspect of the present invention there is provided a receiver, which includes an in-phase path and a quadrature path for conveying received data, and a module provided for the in-phase path and the quadrature path for enhancing image rejection. The module includes a polyphase filter having first and second inputs and first and second outputs, and an adder for adding the first and 90 degree phase shifted signal of the second outputs.

BRIEF DESCRIPTION OF THE DRAWINGS

These and other features of the invention will become more apparent from the following description in which reference is made to the appended drawings wherein:

FIGS. 4A and 4B illustrate examples of the dual band operation of the transceiver of FIG. 3;

FIG. 19A illustrates one examples of the programmable matching block of FIG. 3;

FIG. 19B illustrates another examples of the programmable matching block of FIG. 3;

FIG. 19C illustrates an example of an adjustable capacitive element of FIG. 19A;

DETAILED DESCRIPTION

Embodiments of the present invention provide direct matched and ultra low power-compact transceiver architecture. The transceiver employs an ultra low-IF architecture that can switch frequency bands by swapping in-phase and quadrature-phase paths and selecting a local oscillator frequency. The transceiver implements non-50 ohms direct matching of the transceiver output and receiver input to an antenna. The transceiver also employs image rejection enhancement technique. The transceiver architecture allows for ultra low power applications, enabling, for example, audiology and other low power commutations solutions at multiple carrier frequencies. Such applications may include, but not limited to, wireless data device communications, audiology device (hearing aid etc.) communications, medical implantable device communications.

Figure 3:
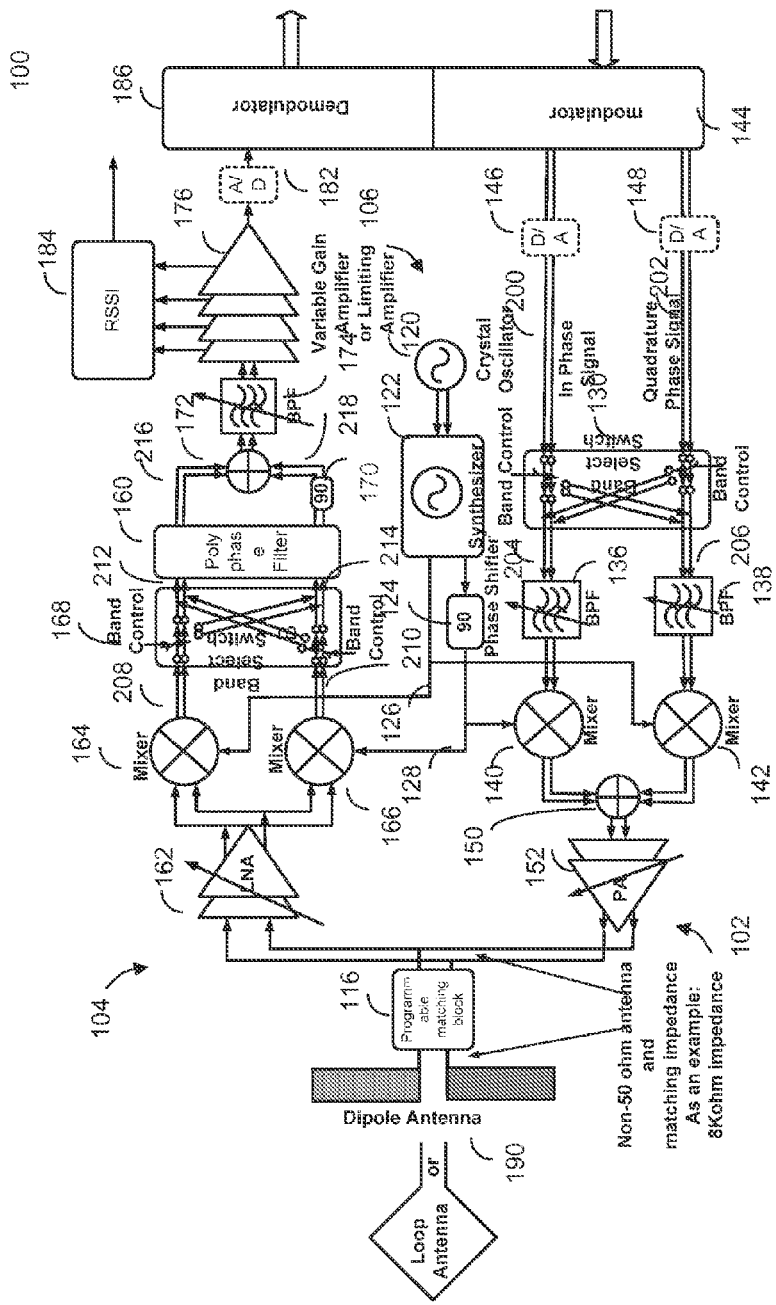
FIG. 3 illustrates an example of a non-50 ohms transceiver having a low-IF transmitter and a low-IF image reject receiver in accordance with an embodiment of the present invention.

FIG. 3 is a diagram illustrating an example of a transceiver in accordance with an embodiment of the present invention. The transceiver 100 of FIG. 3 includes a transmitter 102, a receiver 104, a local oscillator (LO) generator 106, and a programmable matching block 116. The transceiver 100 implements the dual band operation of the transmitter 102 and the receiver 104.

The LO generator 106 includes, for example, a crystal oscillator 120, a synthesizer 122, and a 90° phase shifter 124. The LO generator 106 is a quadrature LO generator. The LO generator 106 produces low-IF local oscillator signals 126 and 128 that are 90 degree phase shifted with respect to each other. The local oscillator signals 126 and 128 are used in the transmitter 102 and the receiver 104. It is noted that the configuration of the LO generator 106 is not limited to that of FIG. 3.

The transmitter 102 includes a plurality of band-path filters (BPFs), a plurality of mixers corresponding to the plurality of BPFs. In FIG. 3, two BPFs 136 and 138 are shown as an example of the plurality of BPFs, and two mixers 140 and 142 are shown as an example of the plurality of mixers. The transmitter 102 includes a band select switch 130 for selectively connecting an in-phase signal path 200 and a quadrature signal path 202 to a first path 204 (the first output of the band select switch 130) and a second path 206 (the second output of the band select switch 130), respectively, or vice versa. The first path 204 is coupled to the BPF 136 and the mixer 140. The first path 206 is coupled to the BPF 138 and the mixer 142. The BPF 136, 138 rejects the harmonics and spurious of the applied signal to the band switch.

In the description, "204" may be used to represent the first output of the switch 130 or the path coupled to the mixer 140; "206" may be used to represent the second output of the switch 130 or the path coupled to the mixer 142.

The in-phase signal path 200 may be connected to the modulator 144 through a digital/analog (D/A) converter 146. The quadrature signal path 202 may be connected to the modulator 44 through a digital/analog (D/A) converter 148.

The in-phase signal path 200 and the quadrature signal path 202 transmit in-phase signals and quadrature signals output from a modulator 144, respectively. The path 200 includes a first signal line and a second signal line for transmitting which represent the differential operation of the transmitter. The path 202 includes a first signal line and a second signal line for transmitting which represent the differential operation of the transmitter. The first path 204 includes a first signal line and a second signal line, corresponding to those of the path 200 or 202. The second path 206 includes a first signal line and a second signal line, corresponding to those of the path 200 or 202.

One mixer 140 mixes the output from the BPF 136 with the local oscillator signal 128. The other mixer 142 mixes the output from the BPF 138 with the local oscillator signal 126. The outputs of the mixers 140 and 142 are supplied to an adder 150. The adder 150 is coupled to the programmable matching block 116 via a power amplifier (PA) 152.

The receiver 104 is a low-IF image reject receiver with a polyphase filter 160 and power combiner after the polyphase filter 160. The receiver 104 includes a low noise amplifier (LNA) 162 and a plurality of mixers. In FIG. 3, two mixers 164 and 166 are shown as an example of the plurality of mixers. The output from the programmable matching block 116 is provided to the LNA 162. One mixer 164 mixes the output from the LNA 162 with the local oscillator signal 126. The other mixer 166 mixes the output from the LNA 162 with the local oscillator signal 128.

The output of the mixer 164 includes a first signal line and a second signal line for transmitting which represent the differential operation of the receiver. The output of the mixer 166 includes a first signal line and a second signal line for transmitting which represent the differential operation of the receiver.

The receiver 104 includes a band select switch 168 having a first input 208 coupled to the output of the mixer 164, a second input 210 coupled to the output of the mixer 166, a first output 212 coupled to the first input of the polyphase filter 160, and a second output 214 coupled to the second input of the polyphase filter 160. The band select switch 160 may be similar or the same as the band select switch 130. The output of the mixer 164 is selectively coupled to the first input 212 of the polyphase filter 160 or the second input 214 of the polyphase filter 160 while the output of the mixer 166 is selectively coupled to the second input 214 of the polyphase filter 160 or the first input 212 of the polyphase filter 160.

In the description, "208" may be used to represent the first input of the switch 168 or the output of the mixer 164; "210" may be used to represent the second input of the switch 168 or the output of the mixer 166.

In the description, "212" may be used to represent the first output of the switch 168 or the first input of the polyphase filter 160; "214" may be used to represent the second output of the switch 168 or the second input of the polyphase filter 160.

The first output of the polyphase filter 160 includes a first signal line and a second signal line for transmitting which represent the differential operation of the transmitter. The second output of the polyphase filter 160 includes a first signal line and a second signal line for transmitting which represent the differential operation of the transmitter. The first stage of image rejection is done by the polyphase filter 160. However the image rejection of the polyphase filter 160 is limited to the mismatch between in-phase and quadrature-phase paths in the layout. The second stage of the image rejection is done by creating 90 phase shift 170 between the two paths after the polyphase filter 160 and adding them at an adder 172 together.

The receiver 104 further includes a BPF 174 and an amplifier 176. The outputs 216 and 218 from the polyphase filter 160 and the 90 phase shifter 170 are supplied to the adder 172. The output from the adder 172 is filtered by the BPF 174 and amplified by the amplifier 176. The amplifier 176 may be a variable gain amplifier or a limiting amplifier.

The output from the amplifier 176 is supplied to a demodulator 180. The demodulator 180 demodulates its input to derive information. An analog/digital (A/D) converter 182 may be located between the amplifier 176 and the demodulator 180. Received Signal Strength Indicator (RSSI) 184 is provided to the amplifier 176.

In transmit mode operation, the signals in the path 200 are filtered and then mixed with the local oscillator signal 126 or 128 while the signals in the path 202 are filtered and then mixed with the local oscillator signal 128 or 126. The frequency band for transmission is selectively switched by swapping the paths 200 and 220, selecting the local oscillator signal or a combination thereof.

In receive mode operation, the signals output from the mixer 164 are supplied to the first input 212 or the second input 214 of the polyphase filter 160 while the signals output from the mixer 166 are supplied to the second input 214 or the second input 212 of the polyphase filter 160. The frequency band is selectively switched by swapping the paths 208 and 210, selecting the local oscillator signal or a combination thereof.

For example, the transceiver 100 may be used for a dual channel hearing aid communication that operates inside MICS band (402-405 MHz) and outside MICS band (406-409 MHz). In this example, one channel is selected at 404 MHz in MICS band; the second channel is selected at 406 MHz; and the local oscillator frequency is selected at 405 MHz. The band selection is implemented by swapping in-phase and quadrature signals in the transmitter 102 and the receiver 104.

The programmable matching block 116 couples the PA 152 and the LNA 162 to the antenna 190. The programmable matching block 116 directly matches the PA 152 (transmitter output) to the antenna 190 in a transmit mode operation and compensates for antenna impedance variations. The programmable matching block 116 directly matches the LNA 162 (receiver input) to the antenna 190 in a receive mode operation and compensates for antenna impedance variations. The antenna 190 may be a loop antenna or a dipole antenna.

FIGS. 4A and 4B are diagrams illustration examples of the dual band operation of the transceiver 100 of FIG. 3. In FIGS. 4A and 4B, "B1" represents one frequency band (frequency band 1); "B2" represents another frequency band (frequency band 2).

Figure 1:
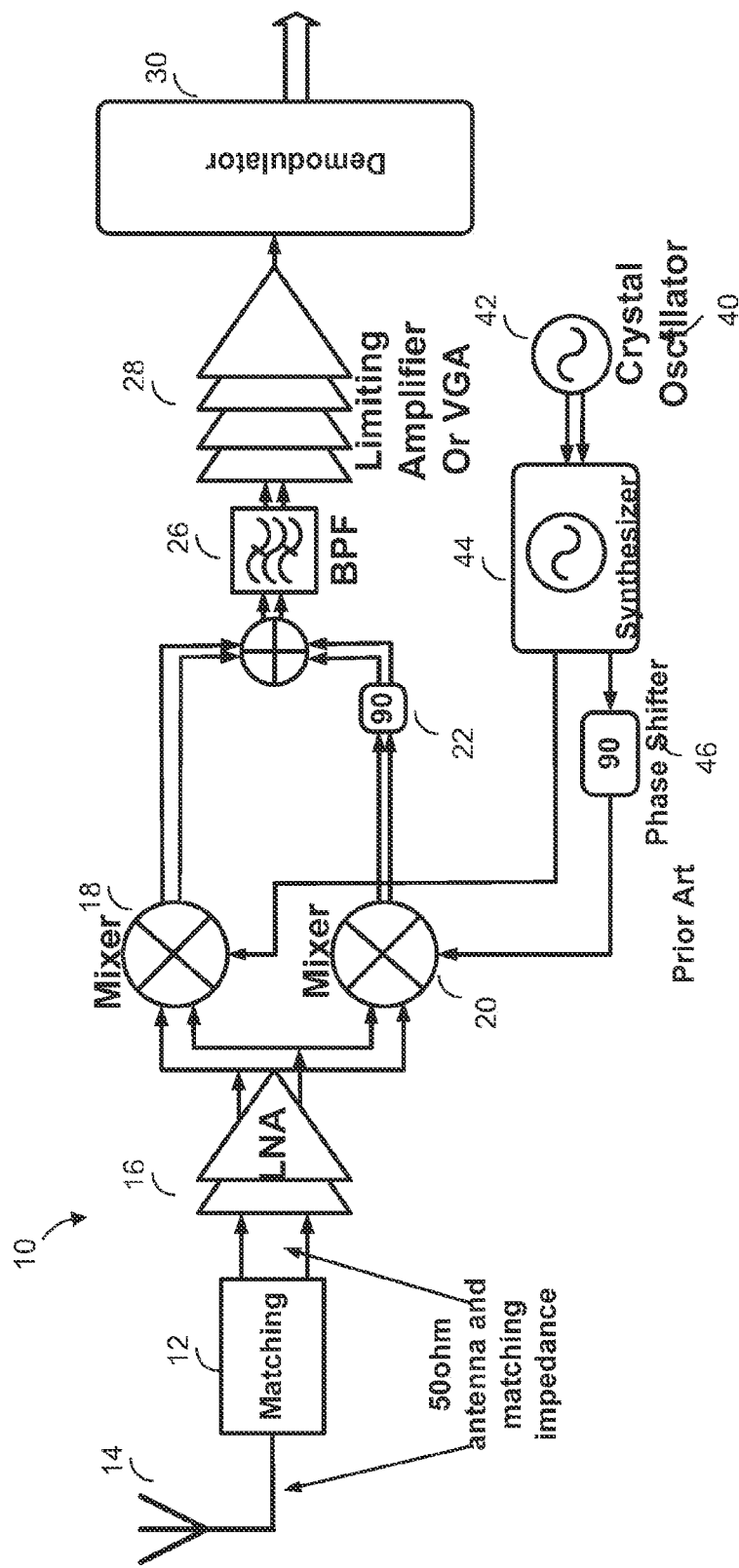
FIG. 1 illustrates a conventional 50 ohms and low-IF receiver.
Figure 2:
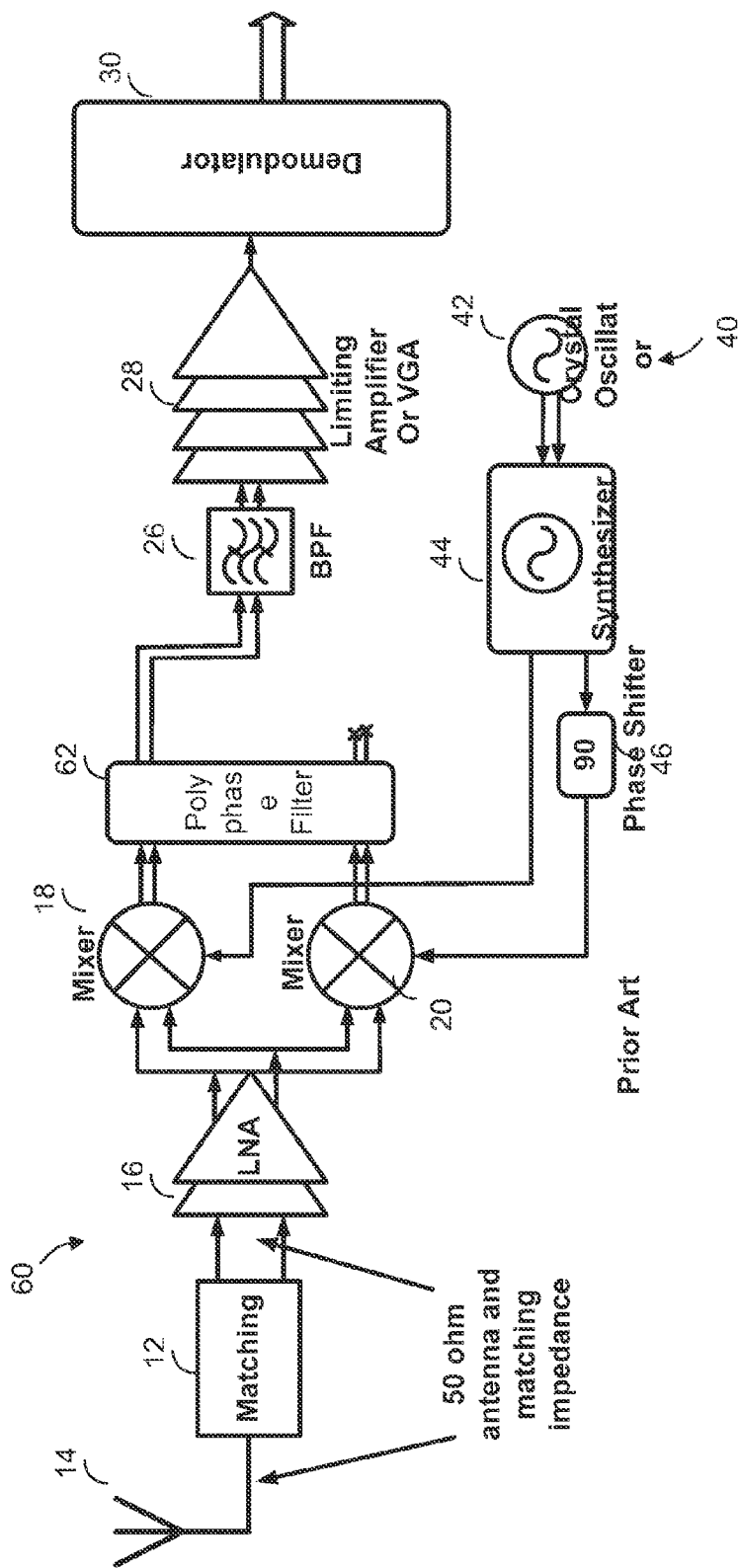
FIG. 2 illustrates another conventional 50 ohms and low-IF receiver.

In FIGS. 4A and 4B, "flo" represents a local oscillator frequency (e.g., the output of the LO generator 106 of FIG. 1); "frfj" (j=1, 2, . . . , n) represents desired channel frequency; "fimj" (j=1, 2, . . . , n) represents image channel frequency; and "fifj" (j=1, 2, . . . , n) represents intermediate frequency (IF) for different channels in case the local oscillator is fixed for the selection of all channels. Another option is to change the local oscillator frequency and keep the intermediate frequency fixed.

FIG. 4A shows an example of operation of a link between two sets of the transceiver in FIG. 3 in band B1. In this link one set acts as a transmitter and the other set acts as a receiver and vice versa. FIG. 4B shows an example of operation of a link between two sets of the transceiver in FIG. 3 in band B2. Band selection is done by the band select switch.

Figure 5:
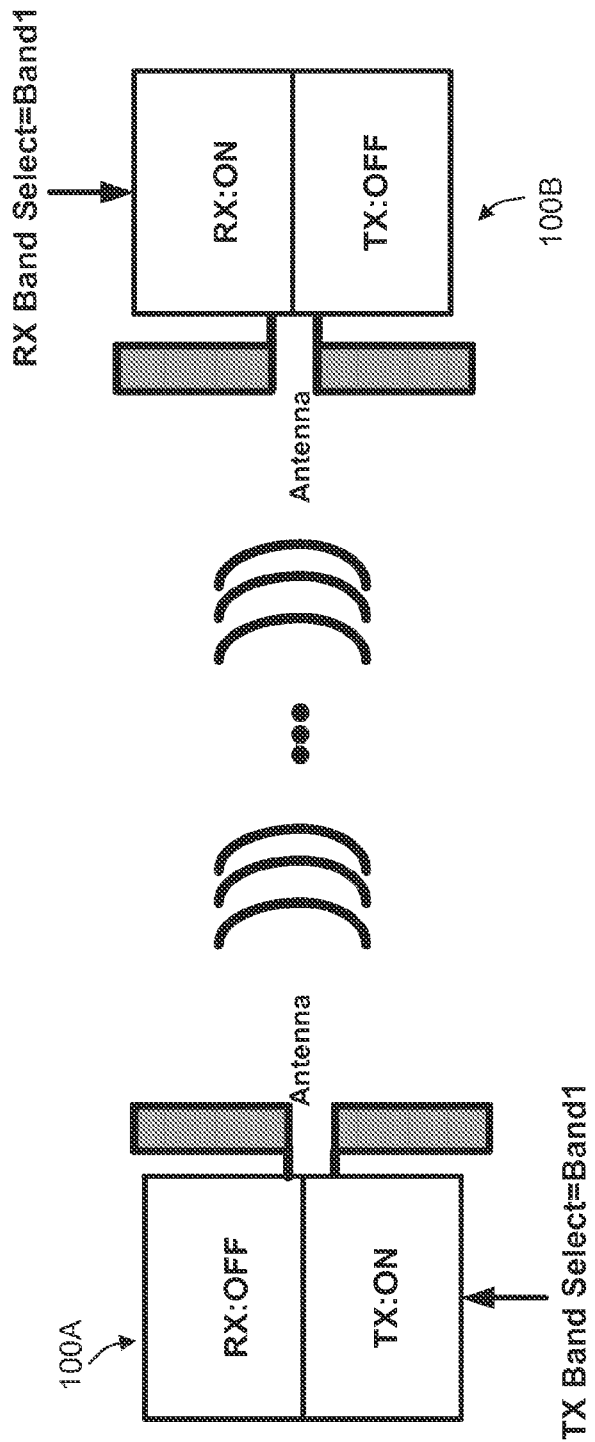
FIG. 5 illustrates an example of the transceiver's operation in a first frequency band.

FIG. 5 is a diagram illustrating an example of the transceiver's operation in frequency band B1. In FIG. 5, two transceivers 100A and 100B are shown. Each of the transceivers 100A and 100B corresponds to the transceiver 100 of FIG. 3 and includes the transmitter 102 of FIG. 3 and the receiver 104 of FIG. 3. In FIG. 5, the transceivers 100A and 100B select frequency band B1 for communication.

Communication signals are transmitted from an antenna (e.g., 190 of FIG. 3) coupled to the transceiver 100A. In the transceiver 100A, the receiver is off ("RX: OFF") and the transmitter is on ("TX: ON"). The transceiver 100A selects frequency band B1 for transmit mode operation. The transceiver 100B receives the communication signals from the transceiver 100A through an antenna (e.g., 190 of FIG. 3) coupled to the transceiver 100B. In the transceiver 100B, the transmitter is off ("TX: OFF") and the receiver is on ("RX: ON"). The transceiver 100B selects frequency band B1 for receive mode operation.

Figure 6:
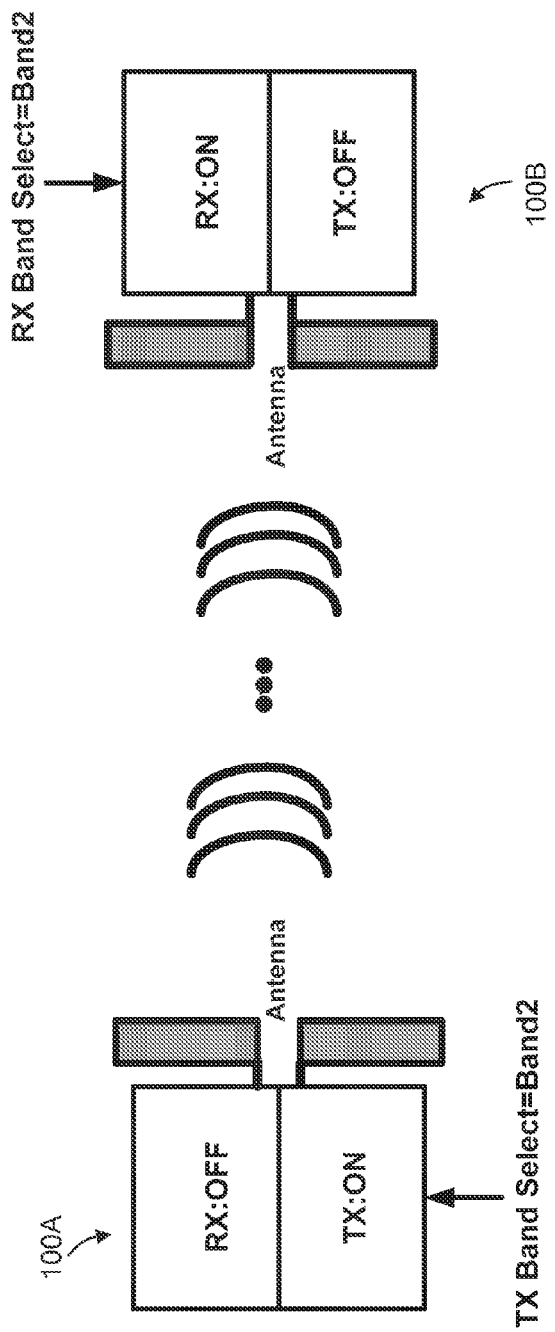
FIG. 6 illustrates an example of the transceiver's operation in a second frequency band.

FIG. 6 is a diagram illustrating an example of the transceiver's operation in frequency band B2. In FIG. 6, the transceivers 100A and 100B select frequency band B2 for communication.

Communication signals are transmitted from the transceiver 100A. In the transceiver 100A, the receiver is off ("RX: OFF") while the transmitter is on ("TX: ON") and selects frequency band B2 for transmit mode operation. The transceiver 100B receives the communication signals from the transceiver 100A. In the transceiver 100B, the transmitter is off ("TX: OFF") while the receiver is on ("RX: ON") and selects frequency band B2 for receive mode operation.

Figure 7:
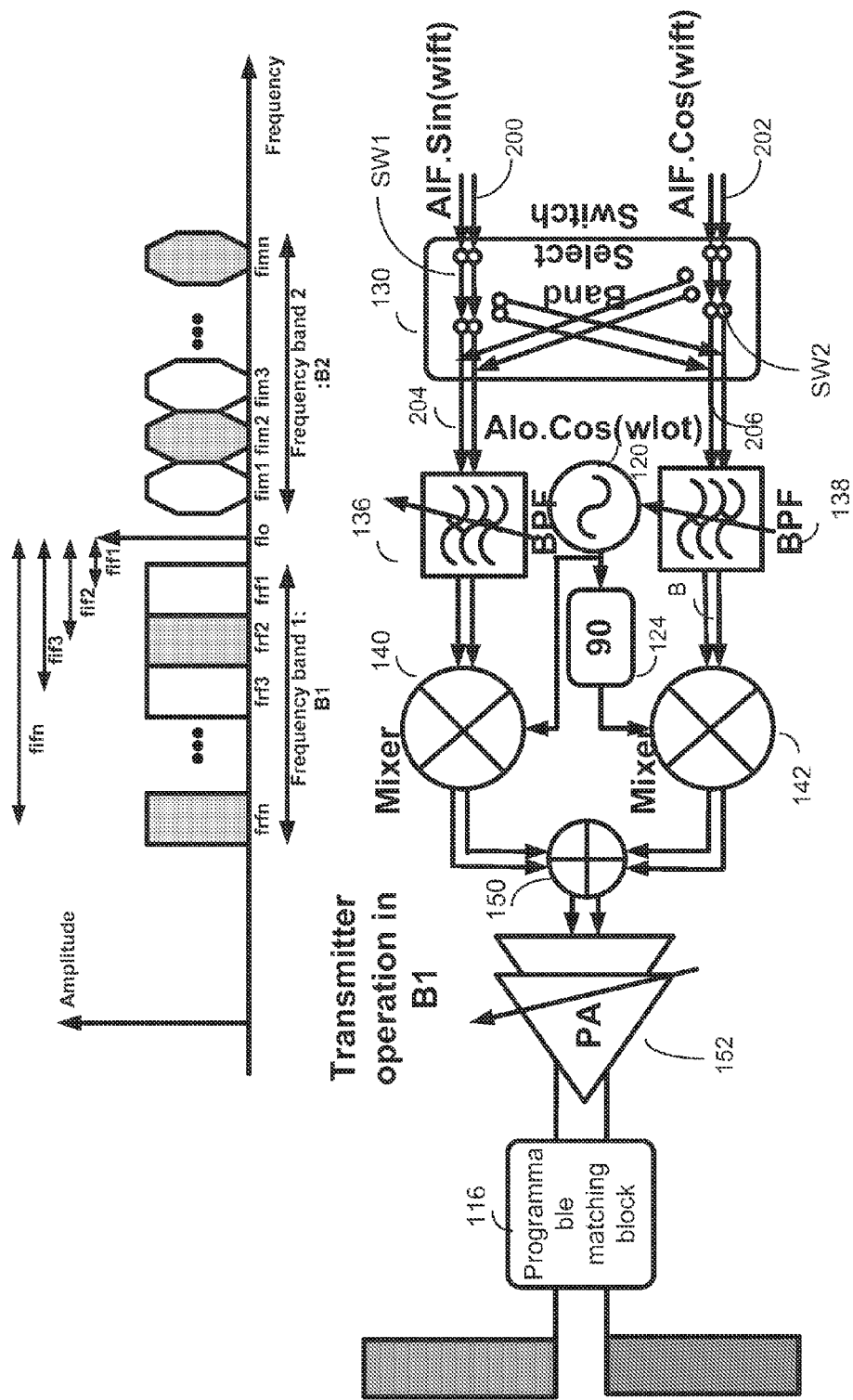
FIG. 7 illustrates an example of the transmitter operation in the first frequency band.

FIG. 7 is a diagram illustrating an example of the transmitter operation in frequency band B1. In FIG. 7, the receiver side is not shown. In FIG. 7, the synthesizer is not used.

The band select switch 130 includes switches SW1 and SW2. The switches SW1 and SW2 are operated by a band select control signal. When frequency band B1 is to be selected, the path 200 is coupled to the first output 204 of the band select switch 130 by the switch SW1 while the path 202 is coupled to the second output 206 of the band select switch 130 by the switch SW2. The first output 204 is connected to the mixer 140. The second output 206 is connected to the mixer 142. The mixer 140 utilizes the local oscillator signal 126 while the mixer 142 utilizes the local oscillator signal 128.

Multiplication of IF and local oscillator signals and adding them together (150) at the output of two mixers 140 and 142 results:

$$AIF·Sin(\omega IFt) \times ALO·Cos(\omega LOt) - AIF·Cos(\omega IFt) \times ALO·Sin(\omega LOt) = -AIF·ALO·Sin((\omega LO - \omega IF)t).$$

"LO" represents Local Oscillator, and "IF" represents Intermediate Frequency. This indicates that the output signal is located at the frequency of ($\omega LO - \omega IF$) which means the transmitter operates at band B1.

Figure 8:
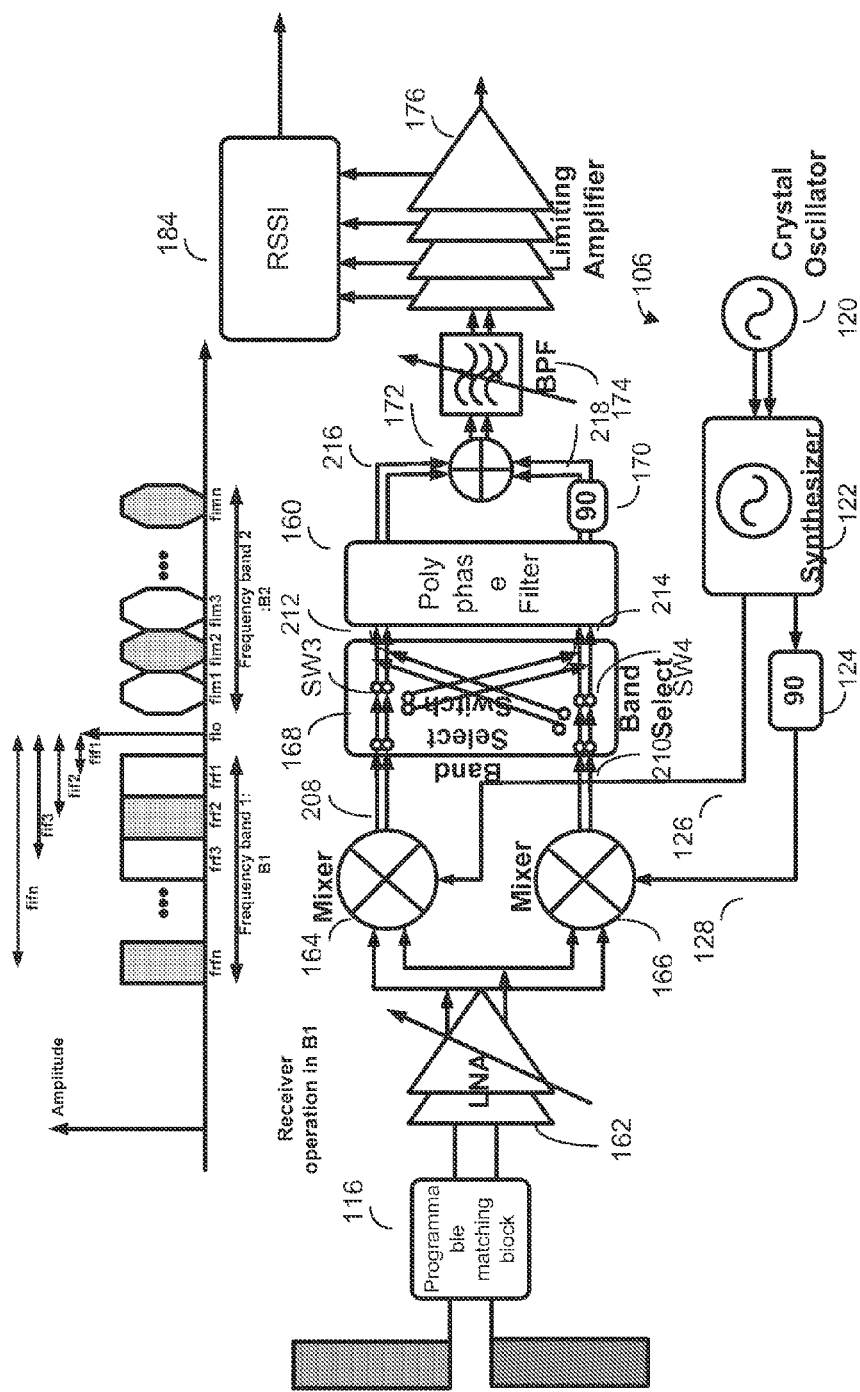
FIG. 8 illustrates an example of the receiver operation in the first frequency band.

FIG. 8 is a diagram illustrating an example of the receiver operation in frequency band B1. In FIG. 8, the transmitter side is not shown.

The band select switch 168 includes switches SW3 and SW4. The switches SW3 and SW4 are operated by a band select control signal. When frequency band B1 is to be selected, the first input 212 of the polyphase filter 160 is coupled to the mixer 164 by the switch SW3 while the second input 214 of the polyphase filter 160 is coupled to the mixer 166 by the switch SW4. The mixer 164 utilizes the local oscillator signal 126 while the mixer 166 utilizes the local oscillator signal 128.

The frequency response of the polyphase filter 160 depends on the phase difference between its inputs. In this configuration the phase of signal line 208 leads the phase of signal line 210 by 90 degree. For this situation signals at frequency band B1 will be passed through the filter 174 and the signal at frequency band B2 will be rejected by the filter 174.

Figure 9:
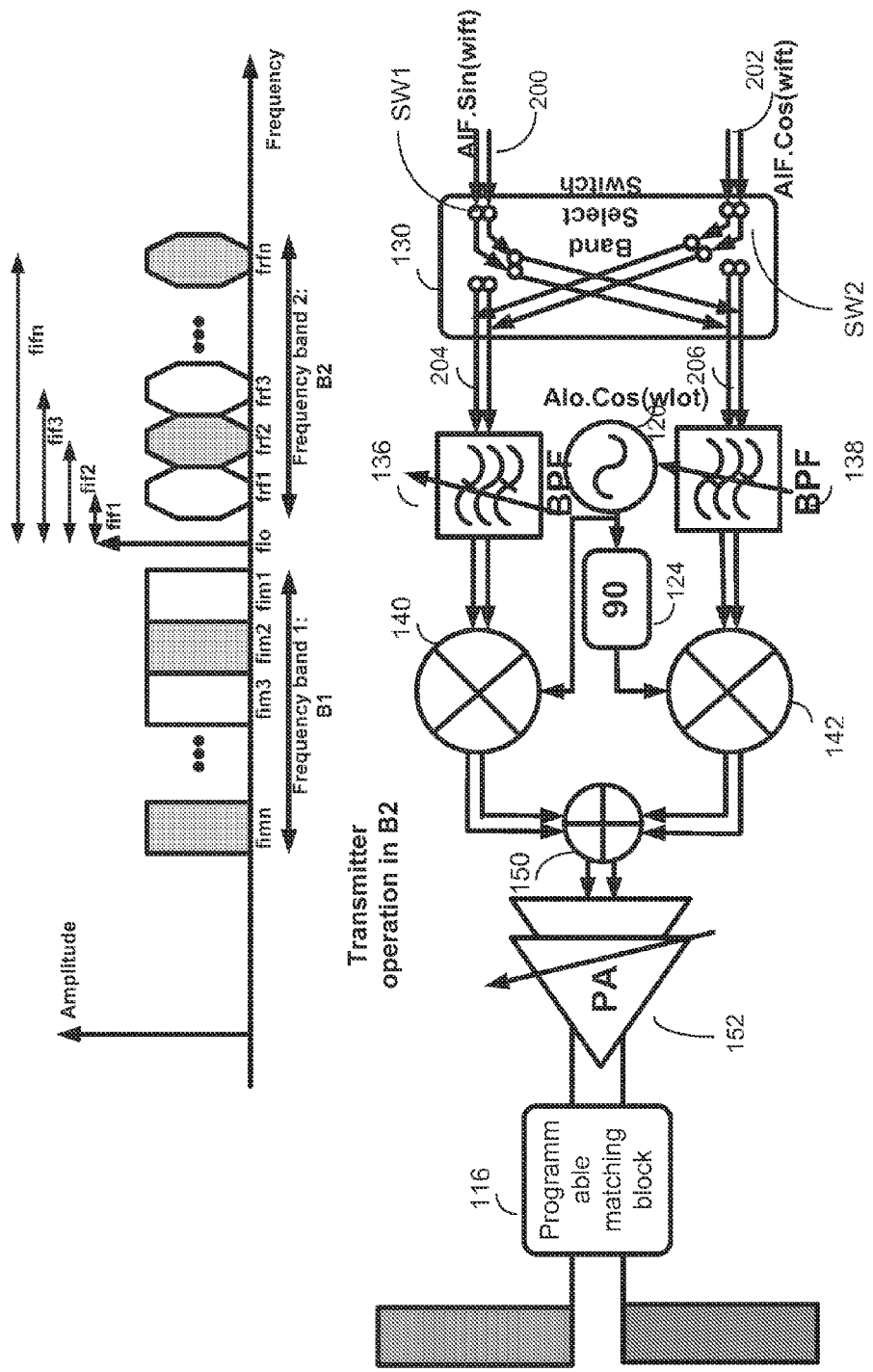
FIG. 9 illustrates an example of the transmitter operation in the second frequency band.

FIG. 9 is a diagram illustrating an example of the transmitter operation in frequency band B2. In FIG. 9, the receiver side is not shown.

When frequency band B2 is to be selected, the in-phase signal path 200 is coupled to the second output 206 of the band select switch 130 by the switch SW1 while the quadrature signal path 202 is coupled to the first output 204 of the band select switch 130 by the switch SW2.

Multiplication of IF and local oscillator signals and adding them (15) together at the output of two mixers 140 and 142 results:

$$AIF·Cos(\omega IFt) \times ALO·Cos(\omega LOt) - AIF·Sin(\omega IFt) \times ALO·Sin(\omega LOt) = AIF·ALO·Cos((\omega LO + \omega IF)t).$$

This indicates that the output signal is located at the frequency of ($\omega LO + \omega IF$) which means the transmitter operates at band B2.

Figure 10:
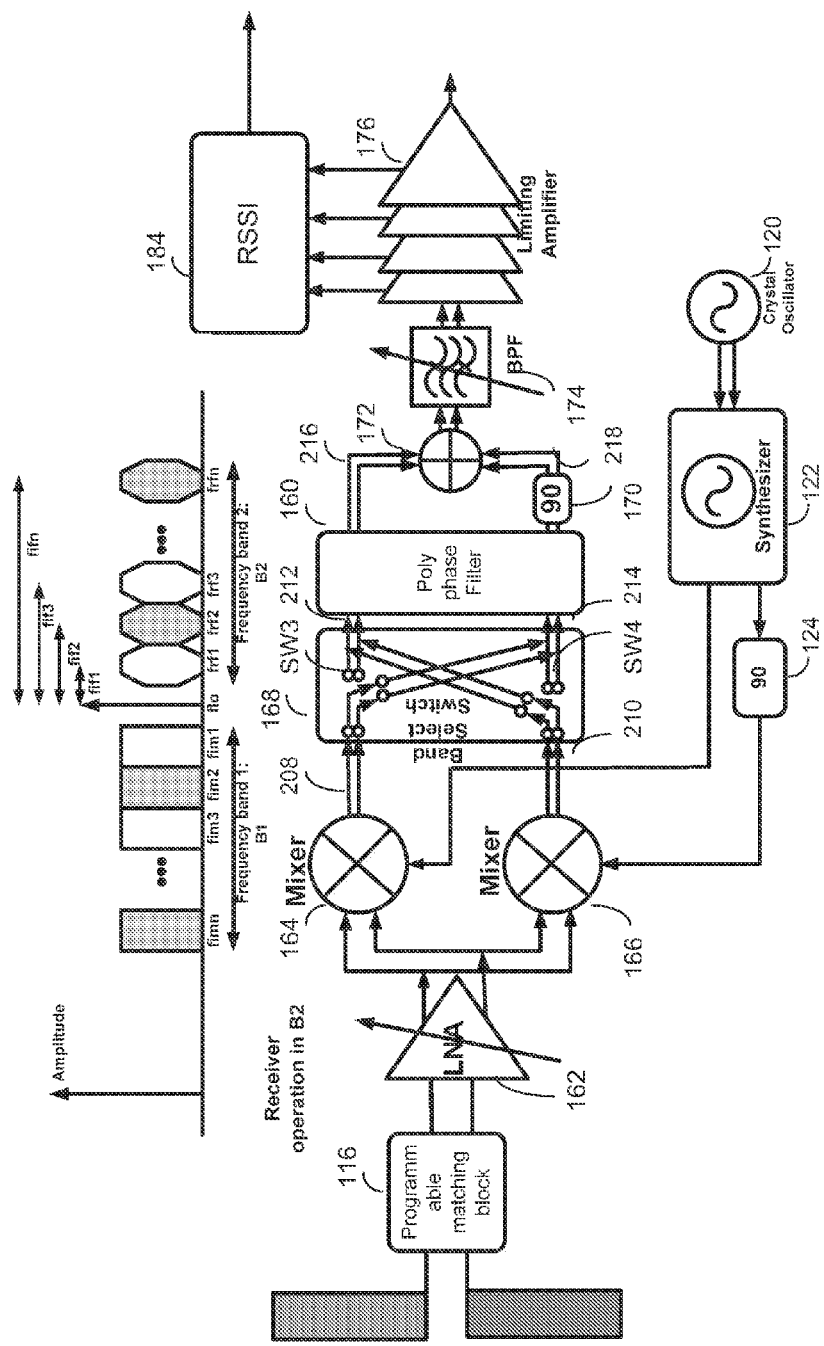
FIG. 10 illustrates an example of the receiver operation in the second frequency band.

FIG. 10 is a diagram illustrating an example of the receiver operation in frequency band B2. In FIG. 10, the transmitter side is not shown.

When frequency band B2 is to be selected, the first input 212 of the polyphase filter 160 is coupled to the mixer 166 by the switch SW4 while the second input 214 of the polyphase filter 160 is coupled to the mixer 164 by the switch SW3. For this configuration the phase of signals to the input of the polyphase filter 160 are swapped. Therefore frequency band B2 will be passed through the filter 174 and frequency band B1 will be behaved as image band and will be rejected.

Figure 11:
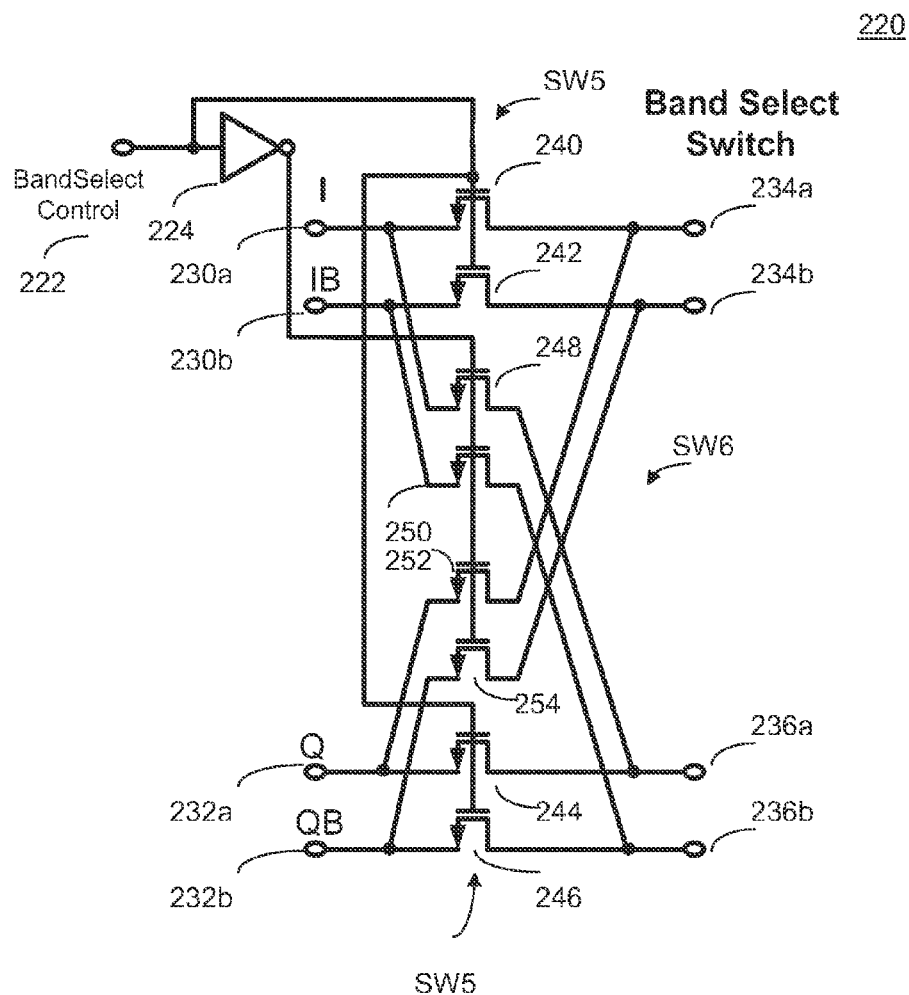
FIG. 11 illustrates an example of the band select switch of FIG. 3.

FIG. 11 is a diagram illustrating an example of the band select switch of FIG. 1. The band select switch 220 of FIG. 11 corresponds to the band select switches 130 and 160 of FIG. 3. The band select switch 220 includes a switch SW5 and a switch SW6. A band select control 222 is provided to the band select switch 220. The band select control 222 is inverted by an inverter 224.

The switch SW5 connects inputs 230a and 230b to outputs 234a and 234b and connects inputs 232a and 232b to outputs 236a and 236b, based on the band select control 222. The switch SW5 includes switch transistors 240 and 242 for connecting the inputs 230a and 230b to the first outputs 234a and 234b, and switch transistors 244 and 246 for connecting the inputs 232a and 232b to the second outputs 236a and 236b.

The switch SW6 connects the inputs 230a and 230b to the outputs 236a and 236b and connects the inputs 232a and 232b to the outputs 234a and 234b, based on the output of the inverter 224. The switch SW6 includes switch transistors 248 and 250 for connecting the inputs 230a and 230b to the second outputs 236a and 236b, and switch transistors 252 and 254 for connecting the inputs 232a and 232b to the first outputs 234a and 234b.

The inputs 230a and 230b correspond, for example, the two signal lines of the in-phase signal path 200 of FIG. 3. The inputs 232a and 232b correspond, for example, the two signal lines of the quadrature signal path 202 of FIG. 3. The outputs 234a and 234b correspond, for example, the two signal lines of the path 204 of FIG. 3. The outputs 236a and 236b correspond, for example, the two signal lines of the path 206 of FIG. 3.

The inputs 230a and 230b correspond, for example, the two signal lines of the switch input 208 of FIG. 3. The inputs 232a and 232b correspond, for example, the two signal lines of the switch input 210. The outputs 234a and 234b correspond, for example, the two signal lines of the polyphase filter input 212 of FIG. 3. The inputs 236a and 236b correspond, for example, the two signal lines of the polyphase filter input 214 of FIG. 3.

Figure 12:
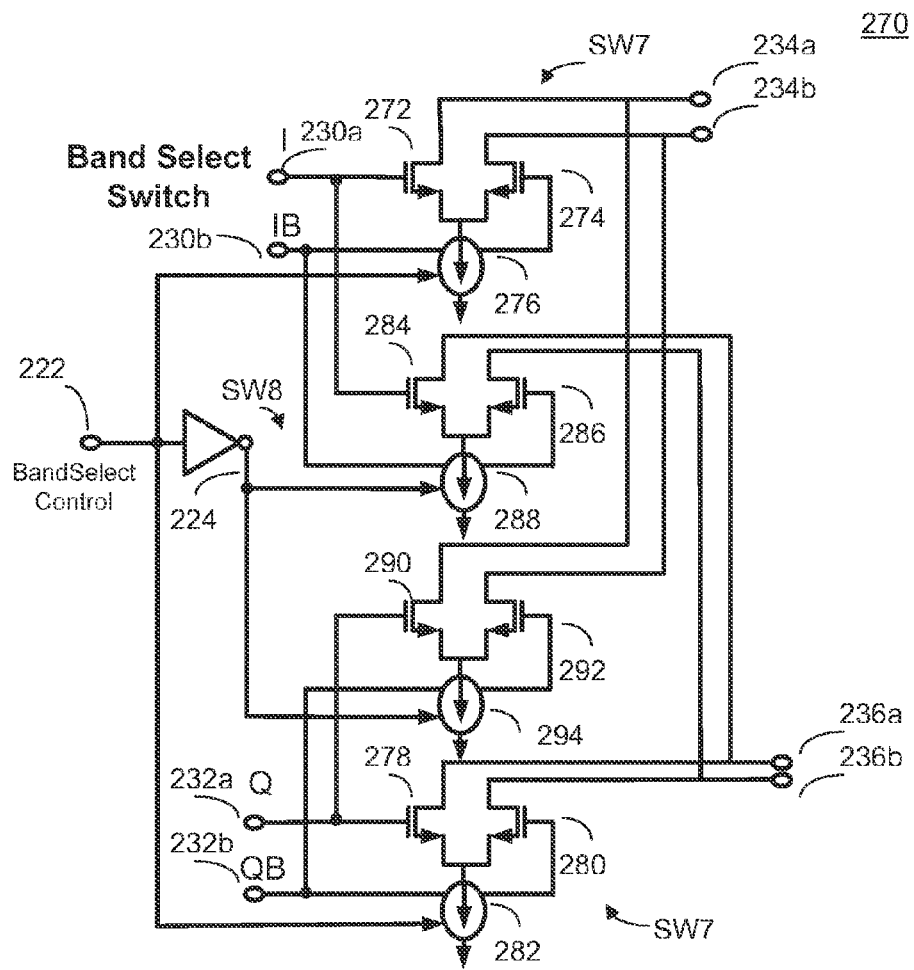
FIG. 12 illustrates another example of the band select switch of FIG. 3.

FIG. 12 is a diagram illustrating another example of the band select switch of FIG. 1. The band select switch 270 of FIG. 12 corresponds to the band select switches 130 and 160 of FIG. 3. The band select switch 270 includes a switch SW7 and a switch SW8. A band select control 222 is provided to the band select switch 270. The band select control 222 is inverted by the inverter 224.

The switch SW7 operates on the first outputs 234a and 234b based on the inputs 230a and 230b and the band select control 222. The switch SW7 operates on the second outputs 236a and 236b based on the inputs 232a and 232b and the band select control 222. The switch SW7 includes switch transistors 272 and 274 and a current source 276, and switch transistors 278 and 280 and a current source 282. By turning the current source on or off the two transistors act as a differential switch which is on or off.

The switch SW8 operates on the second outputs 236a and 236b based on the inputs 230a and 230b and the output from the inverter 224. The switch SW8 operates on the first outputs 234a and 234b based on the inputs 232a and 232b and the output from the inverter 224. The switch SW8 includes switch transistors 284 and 286 and a current source 288, and switch transistors 290 and 292 and a current source 294.

Figure 13:
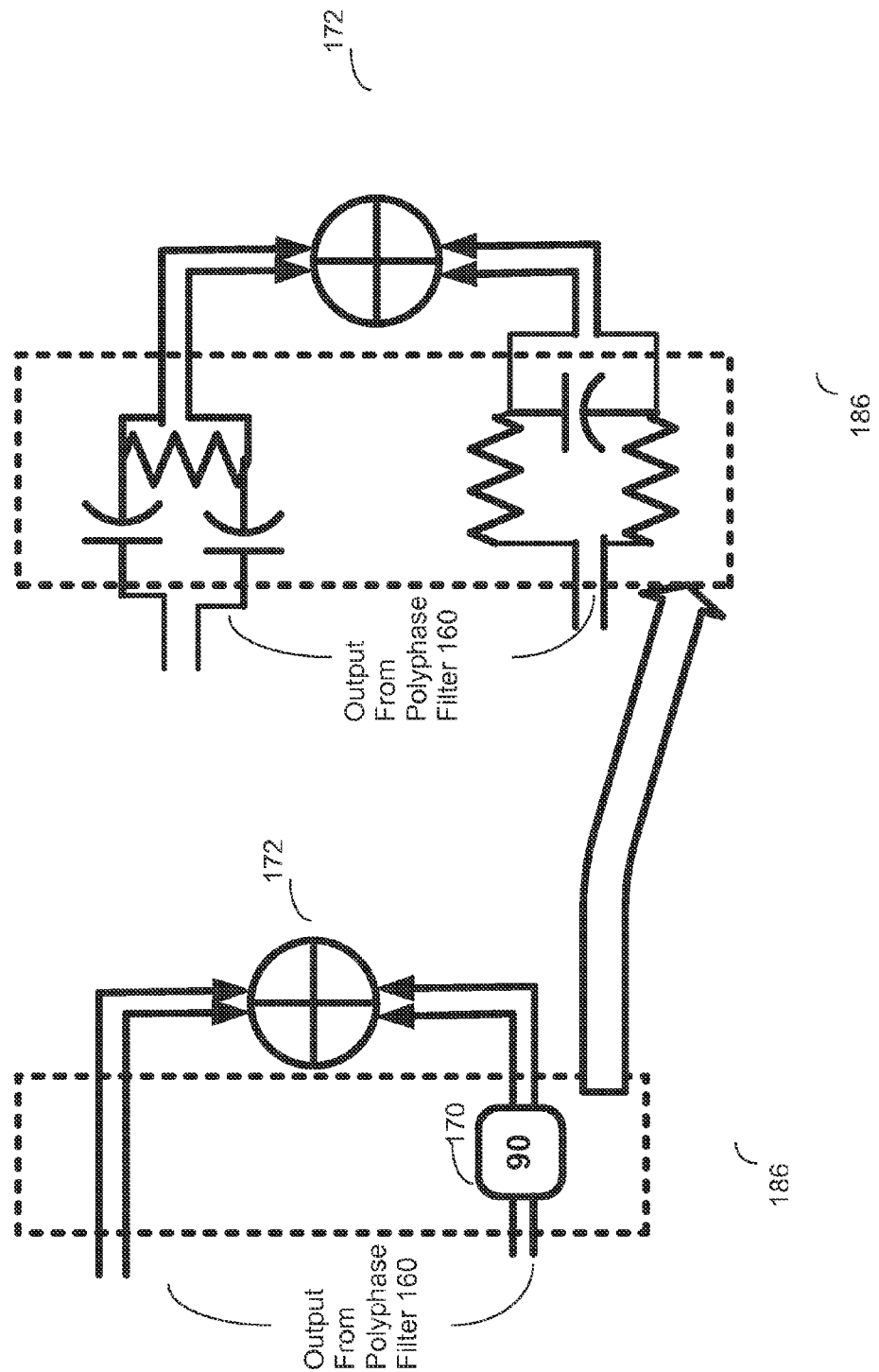
FIG. 13 illustrates an example of creating 90 degree phase shift for the second stage of image rejection at the receiver side of FIG. 3.

FIG. 13 is an example of a diagram illustrating implementation of the 90 degree phase shift for the second stage of image rejection at the receiver side 104 of FIG. 3. The left side of FIG. 13 illustrates the relationship among the output from the polyphase filter 160, the shifter 170 and the adder 172. The right side of FIG. 13 illustrates an example of a path from the output of the polyphase filter 160 to the adder 172. Image rejection is enhanced by combination of two image rejection techniques. The first stage of image rejection is done by the polyphase filter 160. The next stage of image rejection includes 90 degree-phase shift path 186 and the adder 172, and is done by adding 90 degree phase shift (170) at the output of one of the polyphase filter's path and adding the two paths together (172).

Figure 14:
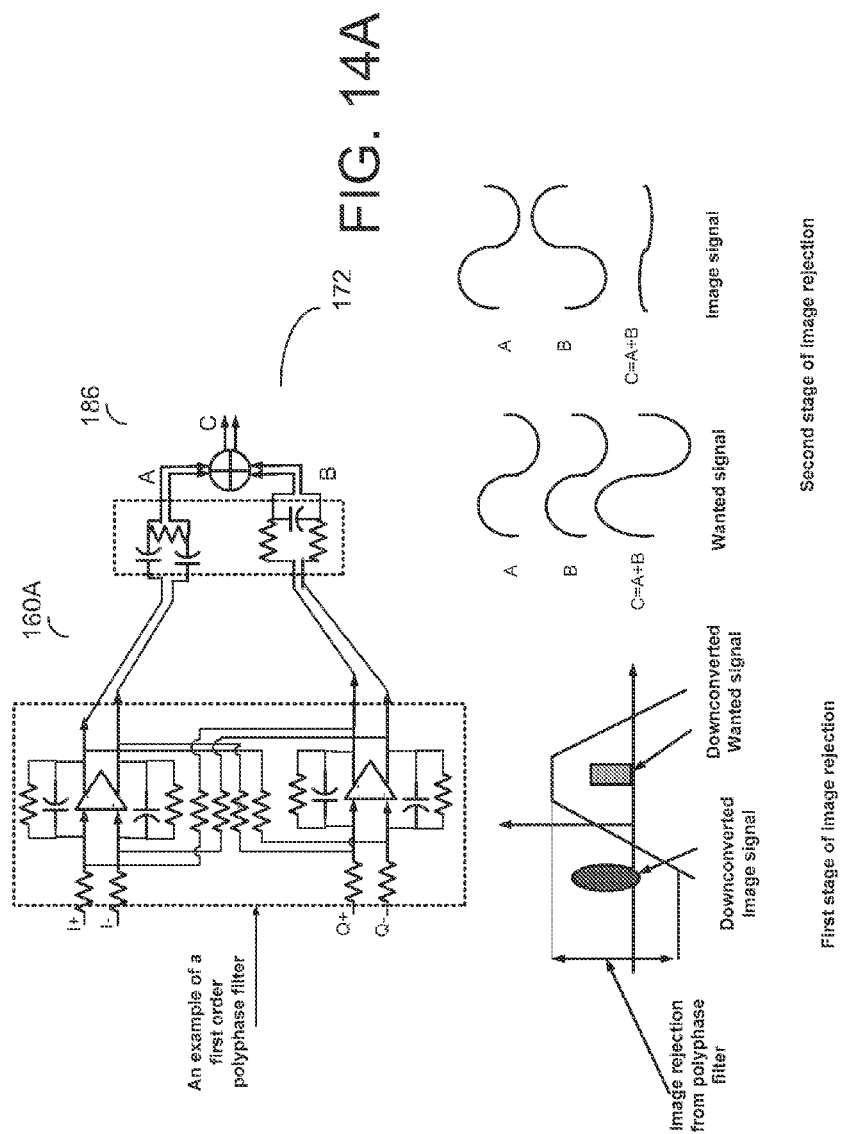
FIG. 14A illustrates an example of the image rejection enhancement of the low-IF architecture by having two stages of image rejection in series.
FIG. 14B illustrates the first stage image rejection of FIG. 14A.
FIG. 14C illustrates waveforms at the second stage image rejection of FIG. 14A.

FIG. 14A illustrates an example of the image rejection enhancement of the low_IF architecture with two stages of image rejection. As shown in FIG. 14A, the image rejection is performed by a first stage image rejection including a polyphase filter 160A, and a second stage image rejection including the 90 degree-phase shift path 186 and the adder 172. The polyphase filter 160A is one example of the polyphase filter 160 of FIG. 3. FIG. 14B illustrates image rejection by the first stage image rejection 160A in FIG. 14A. FIG. 14C illustrates image rejection by the second stage image rejection in FIG. 14A.

Figure 15:
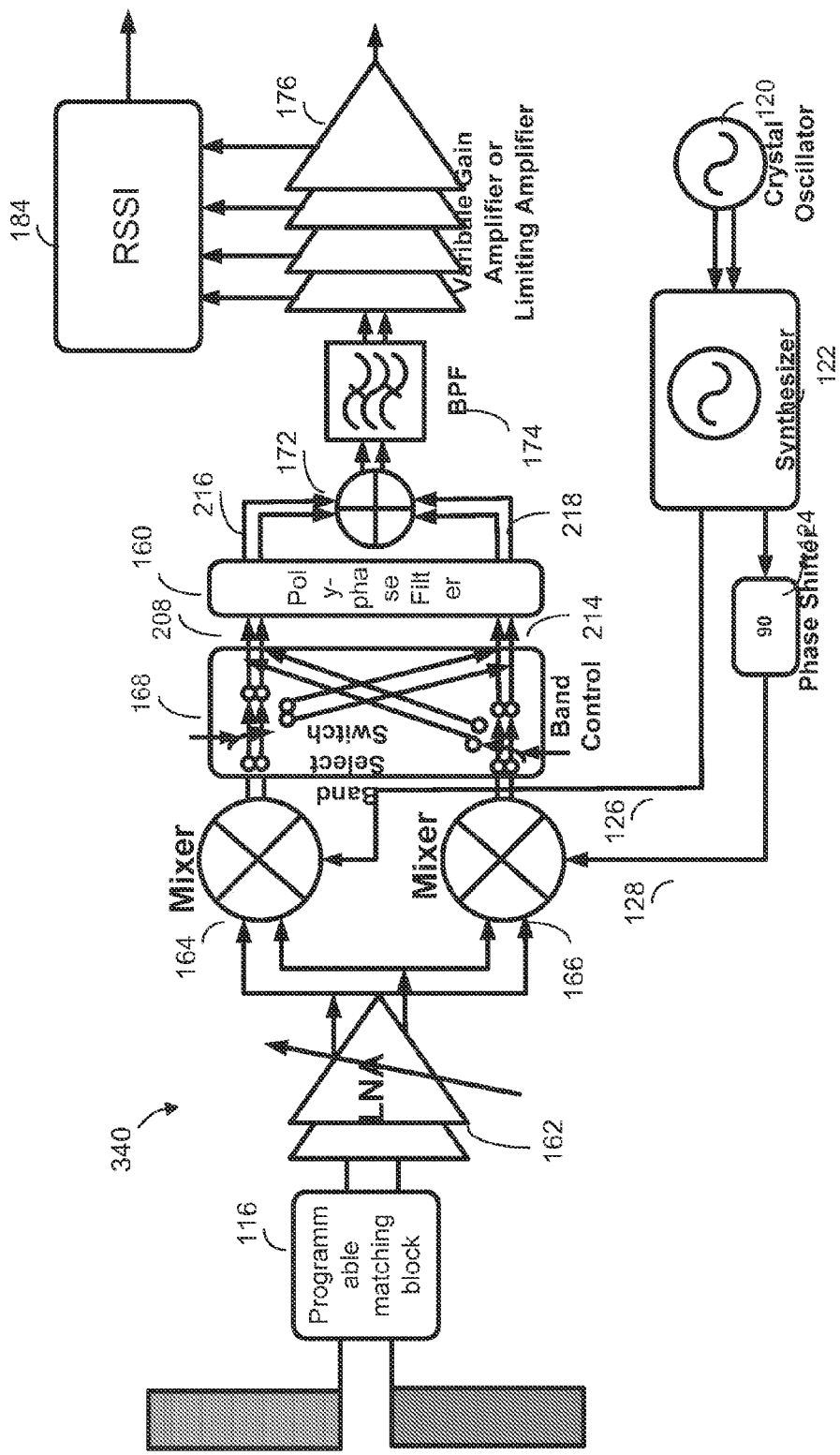
FIG. 15 illustrates another example of the low-IF image reject receiver.

FIG. 15 is a diagram illustrating another example of the low-IF image reject receiver of FIG. 3. The low-IF image reject receiver 340 of FIG. 15 is also usable in the receiver side of the transceiver 100 of FIG. 3. The receiver 340 includes the mixers 164, 166, the polyphase filter 160, and the adder 172. The switch 168 may be provided between the mixers 164 and 166 and the polyphase filter 160.

FIGS. 16A-16D are diagrams illustrating the examples of a quadrature LO generation block employed in the transceiver of FIG. 1. Each of the quadrature LO generation block 400, 410, 430 and 440 of FIGS. 16A-16D is usable as the LO generator 106 of FIG. 3 and provides the quadrature local oscillator signals 126 and 128 of FIG. 3.

Figures 16A, 16B, 16C, 16D:
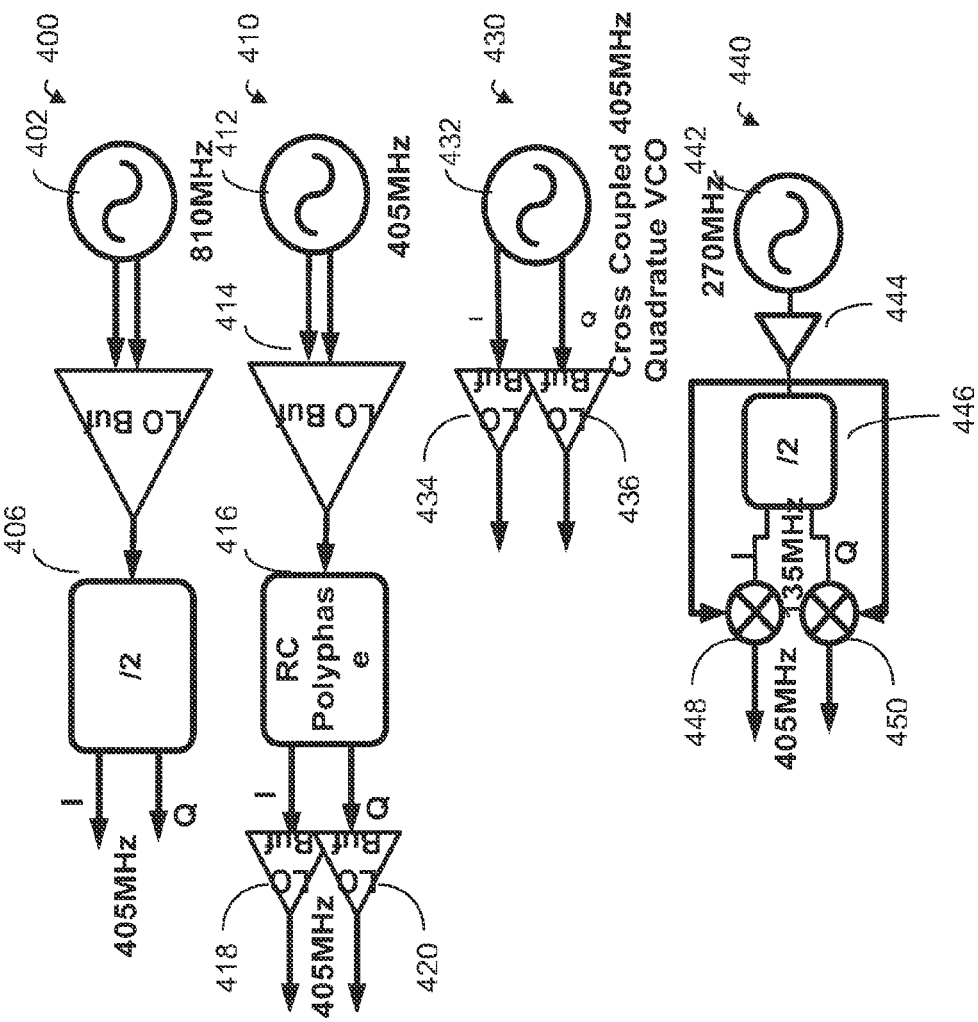
FIG. 16A illustrates an example of the quadrature LO generation block employed in the transceiver of FIG. 3.
FIG. 16B illustrates another example of the quadrature LO generation block employed in the transceiver of FIG. 3.
FIG. 16C illustrates a further example of the quadrature LO generation block employed in the transceiver of FIG. 3.
FIG. 16D illustrates a further example of the quadrature LO generation block employed in the transceiver of FIG. 3.

Referring to FIG. 16A, the quadrature LO generation block 400 includes a voltage control oscillator (VCO) 402 for providing a signal with 810 MHz, a LO buffer 404 and a quadrature signal generator 406 for providing in-phase and quadrature signals with 405 MHz. The 810 MHz VCO 402 is buffered (404) and is divided by 2 by the quadrature generator divider 406.

Referring to FIG. 16B, the quadrature LO generation block 410 includes a VCO 412 for providing a signal with 405 MHz, a LO buffer 414, an RC polyphase block 416 for providing in-phase and quadrature signals and LO buffers 418 and 420 for the in-phase and quadrature signals. The 405 MHz VCO 412 is buffered (414) and quadrature LO signals are generated by the polyphase filter 412 and the buffered (418, 420) again after polyphase filter 412.

Referring to FIG. 16C, the quadrature LO generation block 430 includes a cross coupled quadrature VCO 432 for providing in-phase and quadrature signals with 405 MHz, a LO buffer 434 for the in-phase and quadrature signal, and a LO buffer 436 for the quadrature signal. In this configuration, the two oscillator will be coupled to each other to generate quadrature local oscillator 432.

Referring to FIG. 16D, the quadrature LO generation block 440 includes a VCO 442 for providing a signal with 270 MHz, a buffer 444, a quadrature signal generator 446 for providing in-phase and quadrature signals with 135 MHz, a mixer 448 for mixing the output from the buffer 444 with the in-phase signal and a mixer 450 for mixing the output from the buffer 444 with the quadrature signal. The 270 MHz VCO 442 is buffered (444) and divided by the quadrature divider 446 to generate quadrature LO signals. Then 135 MHz quadrature signals are mixed with the 270 MHz VCO 448, 450 to generate 400 MHz quadrature local oscillator.

Figure 17:
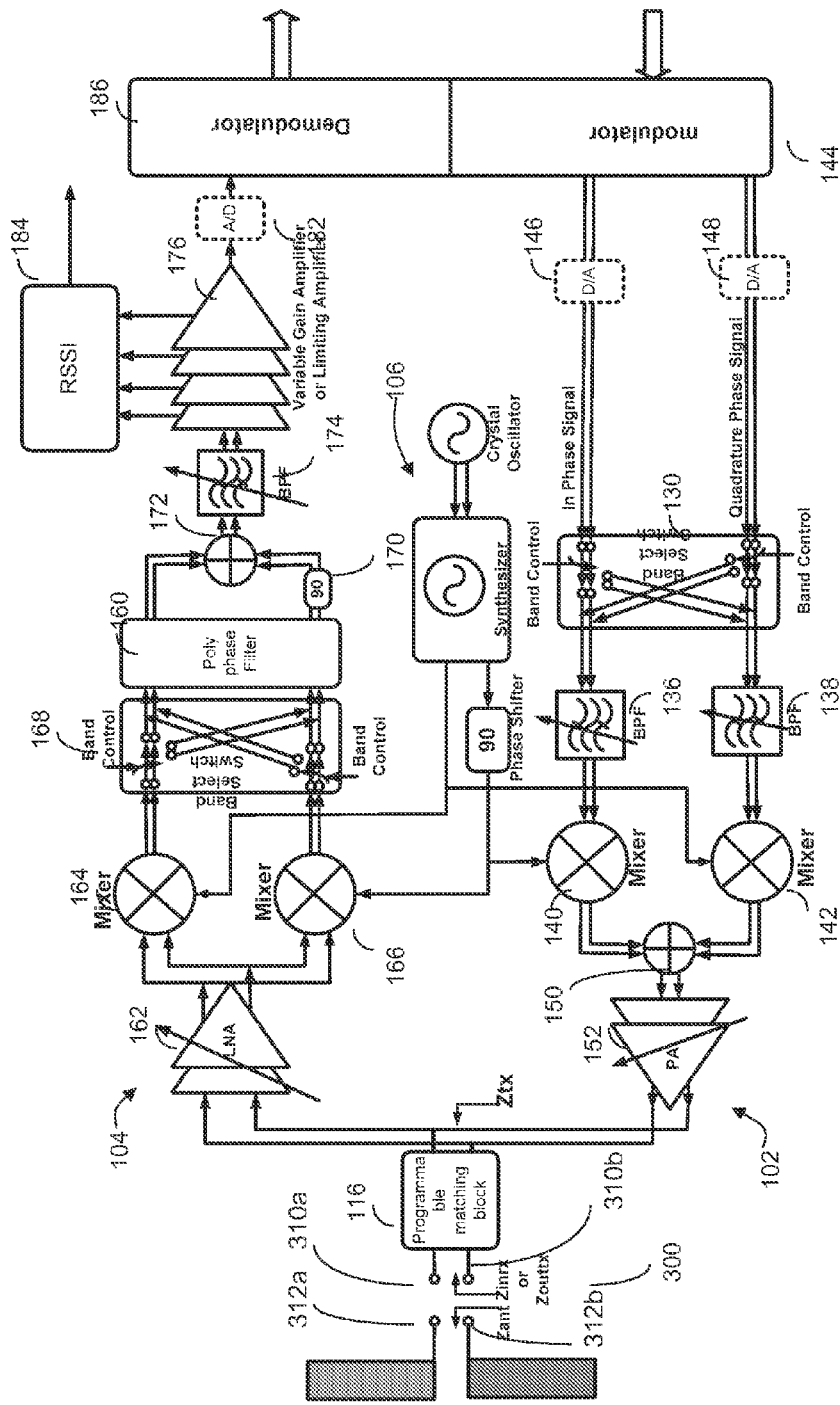
FIG. 17 illustrates a single port and non-50 ohms architecture for the transceiver of FIG. 3 in accordance with an embodiment of the present invention.
Figure 18:
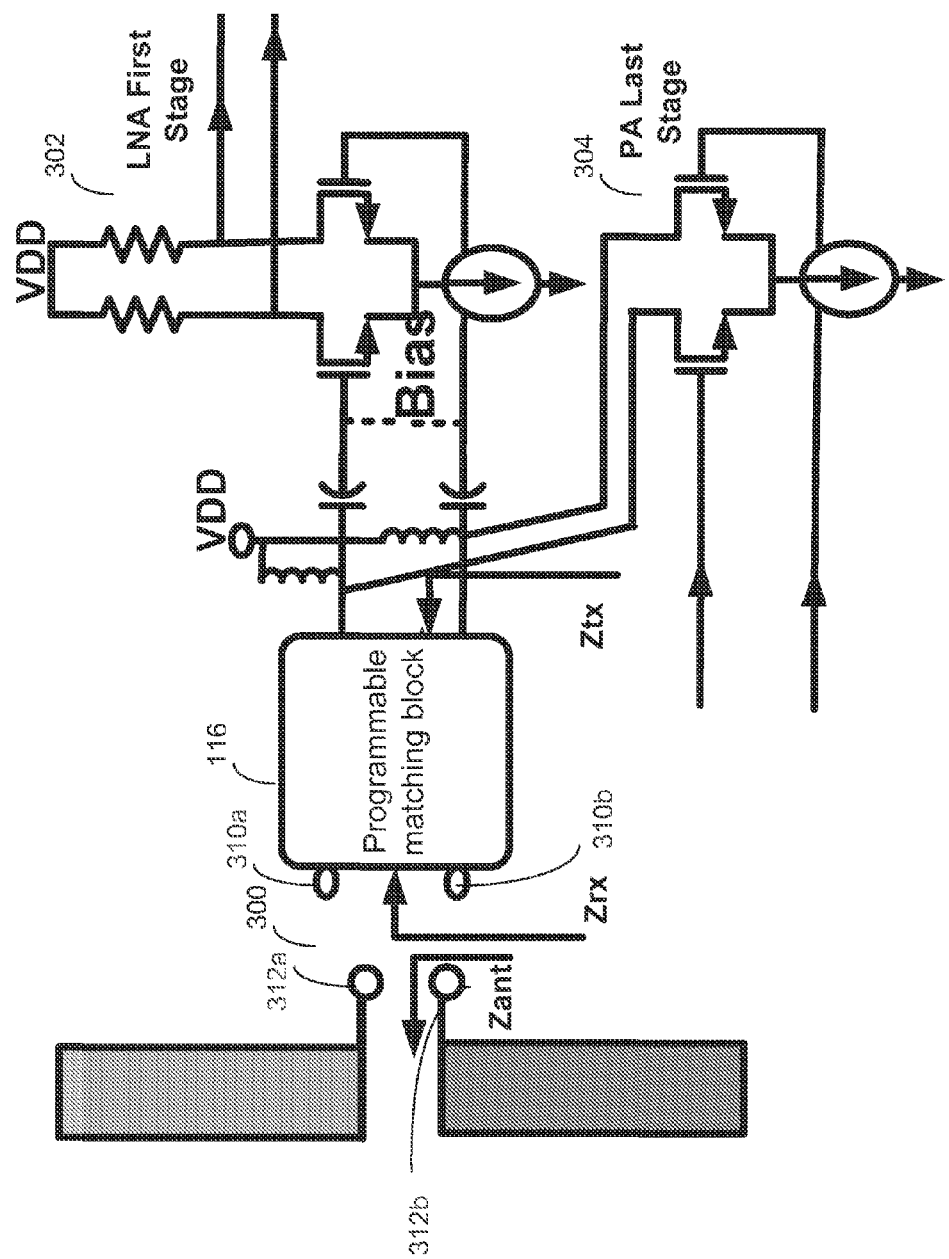
FIG. 18 illustrates an example of the single port and non-50 ohms architecture of FIG. 17 and the first stage of the receiver side and the last stage of the transmitter.

FIG. 17 is a diagram illustrating an example of a single port connection for the programmable matching block 116 of FIG. 3 in accordance with an embodiment of the invention. In FIG. 17, "300" represents a single port connection to an antenna (e.g., 190 of FIG. 3). FIG. 18 is a diagram illustrating an example of the single port and non-50 ohms architecture of FIG. 17 and the first stage of the receiver side and the last stage of the transmitter. In FIG. 18, "302" represents one example of a first stage of the LNA (e.g., 162 of FIG. 3) in the receiver side and "304" represents one example of a last stage of the PA (e.g., 152 of FIG. 3) in the transmitter side. The antenna connected to the programmable matching block 116 is a single port antenna.

Referring to FIGS. 17-18, the port 300 includes connectors 310a and 310b that communicate with the in-phase signal path and the quadrature signal path of the transceiver side. The antenna includes connectors 312a and 312b that are connectable to the connectors 312a and 312b.

In FIG. 18, "Zrx" represents the impedance of the receiver input, and "Ztx" represents the required impedance at the transmitter output. In FIG. 18, "Zant" represents the impedance of the antenna. In receive mode, the programmable matching block 116 directly matches "Zrx" to "Zant" and compensates for the variation of the antenna impedance "Zant". In transmit mode, the programmable matching block 116 directly matches "Zant" to required "Zant" and also compensates for the variation of the antenna impedance "Zant".

The programmable matching block is designed in such a way to transform input impedance of the transceiver in receive mode to the antenna impedance and also transform the antenna impedance to the required impedance at the output of the transceiver in transmit mode. As an example for operation of the transceiver at 400 MHz band the required output impedance at the transmitter output is 8 K ohm to deliver a certain power. Therefore the impedance of a non-50 ohm antenna is transformed to an 8 K ohm at the transmitter output. On the receiver side the input impedance of the receiver is transformed to conjugate impedance of the non-50 ohm antenna. The programmable matching block accommodate the required transformation on both directions and also compensate for the variation in antenna impedance due to change in antenna environment. By applying this matching technique and using programmable matching circuit the required matching circuit for operation in transmit and receive mode can be shared. Therefore there is no need for two antennas or external switch for transmit and receive operation. The conventional design matches the receiver input to 50 ohm or transforms 50 ohm antenna to required impedance at the transmitter output and connect a 50 ohm antenna to the transceiver. Also two different matching circuits or external switch is required for operating in transmit or receive mode. This is not efficient for ultra low power applications because part of signal power will be lost in extra matching components required for matching to 50 ohm and extra off-chip components are required. The programmable matching block 116 compensate for variation in antenna impedance by monitoring RSSI signal and keeps the antenna and front-end in match condition. This mechanism saves the transceiver power and have maximum power transfer between antenna and circuit, especially for ultra low power transceivers (e.g., 100 of FIG. 3).

The transmitter 102 and the receiver 104, and a switch for switching the transmit and receive modes may be on chip. No off-chip switching is required for switching between transmit and receive modes.

FIGS. 19A-19B illustrate examples of the programmable matching block of FIG. 3. In one example, the programmable matching block 116 of FIG. 3 may include a component 116a of FIG. 19A (referred to as programmable matching block 116a). In another example, the programmable matching block 116 of FIG. 3 may include a component 116b of FIG. 19B (referred to as programmable matching block 116b).

Referring to FIGS. 19A-19B, each of the programmable matching blocks 116a and 116b includes the connections 310a and 310b for communicating with an antenna (e.g., 190 of FIG. 3) and connections 314a and 314b for communicating with the PA 152 and LNA 162 of FIG. 3. Each of the programmable matching blocks 116a and 116b may be a module and be detachably connectable to the PA and LNA via 314a and 314b.

The programmable matching block 116a includes adjustable capacitive element 500. The programmable matching block 116b includes adjustable capacitive elements 502 and 504, each of which includes adjustable capacitance.

FIG. 19C illustrates an example of the adjustable capacitive element 500. The adjustable capacitive element 500a of FIG. 19C includes a plurality of capacitors 510a, 510b, 510c, and 510d and a plurality of transistors 512a, 512b, 512c, and 512d. The capacitors 510a, 510b, 510c, and 510d have capacitance C0, C1, C2, C4, respectively. The transistors 512a, 512b, 512c, and 512d have gate terminals for receiving control signals B0, B1, B2, and B3, respectively. The control signals B0, B1, B2, and B3 are determined by, for example, RSSI. In response to the control signals B0, B1, B2, and B3, the capacitance of the element 500a is determined. The adjustable capacitive element 502, 504 of FIG. 19B may have structure similar to the adjustable capacitive element 500a of FIG. 19C.

In cases that antenna environment changes the antenna impedance changes. As an example when the antenna is close to human body or human head in case of hearing aid application the antenna impedance changes compare to the situation that antenna is in free space. The programmable matching circuit matches the new antenna impedance in new environment to the transmit output or receive input impedance. The variable element in the programmable matching circuit is at least one or two capacitors that can be changed digitally by a number of digital bits. The resolution of the programmability depends on the number of bits that are used to control the capacitance.

It is well understood by one of ordinary skill in the art that the components 116A, 116B and 116C of FIGS. 19A-19C are examples only. The programmable matching block 116 of FIG. 3 may include programmable adjustable inductive elements.

Figure 20A:
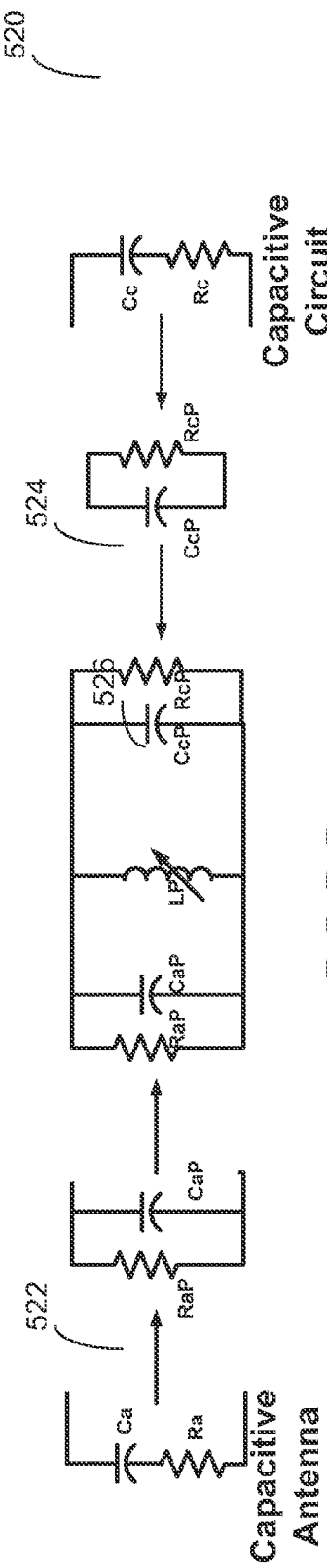
FIG. 20A illustrates an example of direct matching of a capacitive antenna to a capacitive circuit.
Figure 20B:
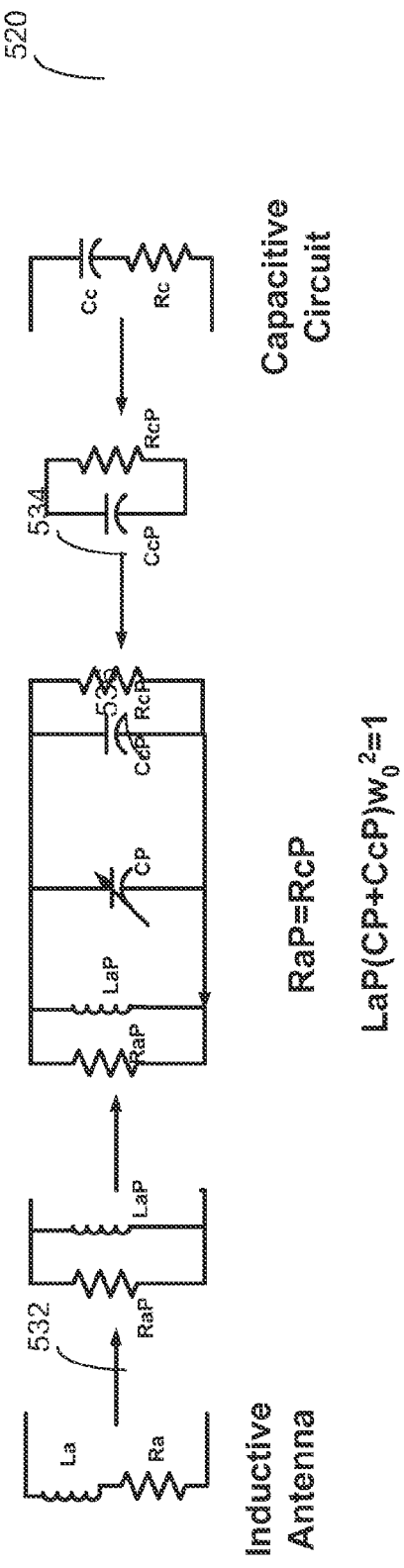
FIG. 20B illustrates an example of direct matching of an inductive antenna to the capacitive circuit.

FIGS. 20A and 20B illustrate examples of direct matching of a capacitive antenna and an inductive antenna to a capacitive circuit, respectively. In FIGS. 20A and 20B, "520" represents a conductive circuit. The conductive circuit 520 may be, the first stage of the receiver 104 of FIG. 3, or the last stage of the transmitter 102 of FIG. 3. In FIG. 20A, "522" represents a capacitive antenna which is an example of the antenna attached to the transceiver 100 of FIG. 3. In FIG. 20A, "524" shows direct matching of the capacitive antenna 522 to the capacitive circuit 520 through the programmable matching block (116) having an adjustable inductive element 526. In FIG. 20B, "532" represents an inductive antenna which is an example of the antenna attached to the transceiver 100 of FIG. 3. In FIG. 20B, "534" shows direct matching of the inductive antenna 532 to the capacitive circuit 520 through the programmable matching block (116) having an adjustable capacitive element 536.

One or more currently preferred embodiments have been described by way of example. It will be apparent to persons skilled in the art that a number of variations and modifications can be made without departing from the scope of the invention as defined in the claims.

What is claimed is:

1. A transceiver, comprising:
   a receiver;
   a transmitter; and
   a programmable matching block that compensates for antenna impedance variation due to environment change and implementing impedance-matching between an antenna and a receiver input and between the antenna and a transmitter output through a shared matching circuit block, the programmable matching block including an inductor and a programmable capacitor coupled in parallel between terminals of the transmitter and the receiver in the shared matching block.

2. A transceiver as claimed in claim 1, wherein the programmable matching block is detachably connectable to the antenna.

3. A transceiver as claimed in claim 1, wherein the programmable matching block is detachably connectable to the antenna via a single port.

4. A transceiver as claimed in claim 1, wherein the programmable capacitor comprises a plurality of capacitors, each capacitor coupled in series with a respective transistor between the terminals.

5. A transceiver as claimed in claim 4, wherein each respective transistor has a terminal for receiving a respective control signal, wherein a control signal is provided by a number of bits equal to a number of respective transistors.

6. A transceiver as claimed in claim 5, wherein the control signal is determined by a received signal strength indicator.

7. A transceiver as claimed in claim 1, wherein the antenna is an inductive antenna.

8. A transceiver, comprising:
   a receiver;
   a transmitter; and
   a programmable matching block that compensates for antenna impedance variation due to environment change and implementing impedance-matching between an antenna and a receiver input and between the antenna and a transmitter output through a shared matching circuit block, the programmable matching block including a first programmable capacitor coupled in parallel between upper and lower terminals of the antenna, a second programmable capacitor coupled in parallel between upper and lower terminals of the transmitter and the receiver in the shared matching block, a first inductor coupled between the upper terminal of the antenna and the upper terminal of the transmitter and receiver in the shared matching block and between the first programmable capacitor and the second programmable capacitor, and a second inductor coupled between the lower terminal of the antenna and the lower terminal of the transmitter and receiver in the shared matching block and between the first programmable capacitor and the second programmable capacitor.

9. A transceiver as claimed in claim 8, wherein the programmable matching block is detachably connectable to the antenna.

10. A transceiver as claimed in claim 8, wherein the programmable matching block is detachably connectable to the antenna via a single port.

11. A transceiver as claimed in claim 8, wherein:
    the first programmable capacitor comprises a plurality of capacitors, each capacitor of the respective plurality of capacitors of the first capacitor being coupled in series with a corresponding transistor between the upper and lower terminals of the antenna; and the second programmable capacitor comprises a plurality of capacitors, each capacitor of the respective plurality of capacitors of the second capacitor being coupled in series with a corresponding transistor between the upper and lower terminals of the transmitter and receiver.

12. A transceiver as claimed in claim 11, wherein each of the transistors has a terminal for receiving a respective control signal, wherein a control signal is provided by a number of bits equal to a number of respective transistors.

13. A transceiver as claimed in claim 12, wherein the control signal is determined by a received signal strength indicator.

14. A transceiver as claimed in claim 8, wherein the antenna is an inductive antenna.

* * * * *